United States Patent [19]
Brothers

[11] 3,782,587
[45] Jan. 1, 1974

[54] SEALING MEANS
[75] Inventor: Jack Brothers, Panama City, Fla.
[73] Assignee: Jerry Pentel, Roxbury Township, R.D. Flanders, N.J.; a part interest
[22] Filed: Dec. 6, 1972
[21] Appl. No.: 312,619

[52] U.S. Cl...... 220/46 R, 29/DIG. 34, 292/256.73, 277/180
[51] Int. Cl............................................. B65d 53/00
[58] Field of Search.................... 220/46, 45, 81; 285/336; 277/180, 181, 182; 287/20.92, 189.36 J; 29/400, DIG. 34; 292/256.71, 256.73

[56] References Cited
UNITED STATES PATENTS
1,155,963   10/1915   Schaller ..................... 220/46 R X Primary Examiner—William T. Dixson, Jr.
Assistant Examiner—Steven M. Pollard
Attorney—Bernard J. Murphy

[57] ABSTRACT

The means seal a fluid joint, formed of interfacing elements of indeterminate configuration along the joint, where the elements have recesses formed in the interfacing surfaces, by defining a sealing element of ductile material to conform to the indeterminate configuration by die-cutting the material to separate out a sealing sub-element which cooperates with the interfacing surfaces, and collateral resilient seals, the latter under a constant, high pressure constraint, to define a plurality of compliant and resilient sealing surfaces.

8 Claims, 7 Drawing Figures

PATENTED JAN 1 1974
3,782,587
SHEET 1 OF 2
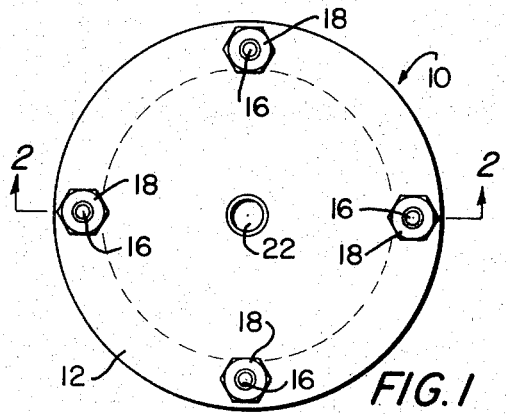
FIG. 1
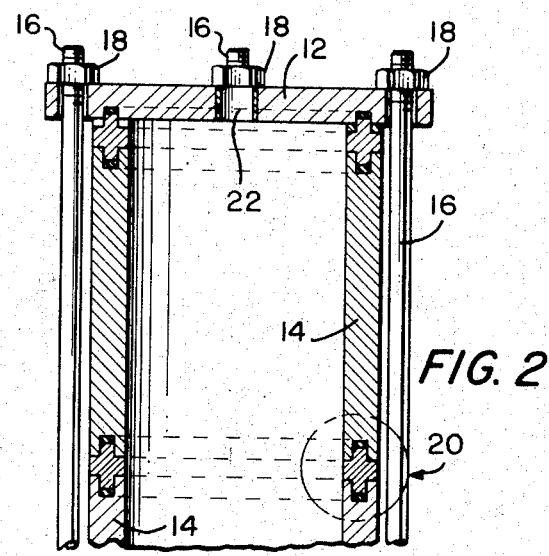
FIG. 2
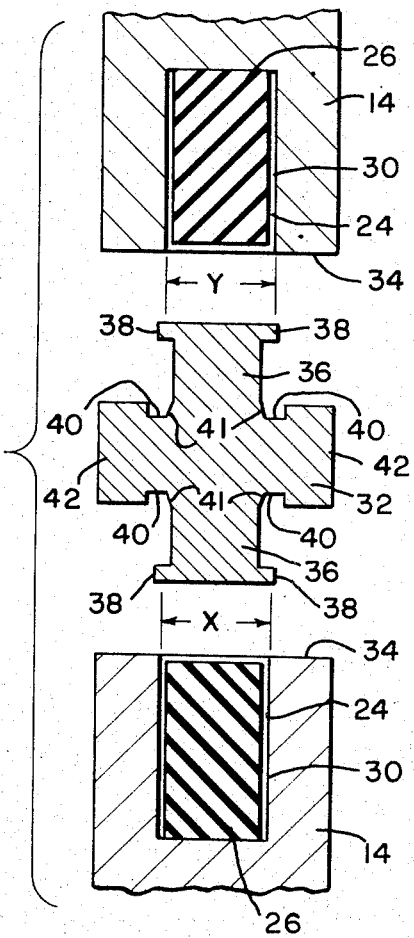
FIG. 4
FIG. 3

PATENTED JAN 1 1974

SEALING MEANS

This invention pertains to sealing means. and in particular to such means in which a principal sealing sub-element is formed, in the sealing or closure operation, to conform to an indeterminate configuration which obtains between those elements which interface to form a fluid joint.

Sealing means and methods are known, in the prior art, wherein interfacing elements of indeterminate configuration have sealing members of complementary configuration disposed therebetween. However, it is a manufacturing expense and burden to have to conform the sealing members to the indeterminate configuration. It would be less expensive and more expedient to be able to seal a fluid joint between interfacing elements of indeterminate configuration by die-cutting a sealing member therefor in the process of closing the interfacing elements upon each other.

Also, in the prior art it is known to close a fluid joint through the use of resilient sealing members or compliant members. Yet, in the former practice, the very resilience of the sealing member renders it yieldable before fluid pressure and liable to leakage. In the latter practice where, for instance, a ductile material sealing element is deployed, the sealing element is compressed to an optimum configuration, resistant of the fluid pressure, but it retains the compressed configuration. It has no dynamic property, thus upon being subjected to temperature excursions it can permit unwanted fluid leakage. A more efficient sealing method and means would comprise those which incorporate the efficiency of both the resilient seal, responsive to temperature excursions, and the dynamic seal with its attendant strength.

It is an object of this invention, then, to teach more efficient sealing means than those known in or offered by the prior art.

It is a particular object of this invention to set forth sealing means for a fluid joint, wherein the joint is formed by interfacing members of indeterminate configuration along the joint, and said members have recesses formed in the interfacing curfaces thereof, comprising a plurality of resilient elements disposed in said recesses, and a ductile element compressed between said interfacing surfaces, said ductile element having surfaces which urge said resilient elements, compressively, into said recesses, wherein said interfacing elements and said ductile element cooperate to define first and second fluid pressure areas, to either sides of said fluid joint, and said interfacing surfaces, said ductile element, and said resilient elements, cooperatively define at least four compliant sealing surfaces, and at least two resilient sealing surfaces, between said first and second fluid pressure areas.

A feature of this invention comprises the sealing of a fluid joint, formed of interfacing elements of indeterminate configuration along the joint, where the elements have recesses formed in the interfacing surfaces, by forming a sealing sub-element of ductile material into conformity with the indeterminate configuration. The sub-element is formed by a die-cutting of the material, separating out the sub-element for cooperation with the interfacing surfaces and resilient seals, to define a plurality of compliant and resilient sealing surfaces.

Further objects and features of this invention will become more apparent by reference to the following description, taken in conjunction with the accompanying figures, in which:

FIG. 1 is a plan view of a pressure vessel which uses the novel seal;

FIG. 2 is a cross-sectional view of the pressure vessel of FIG. 1, taken along section 2—2 thereof, showing an embodiment of the novel sealing means in use therein;

FIG. 3 is an enlarged cross-sectional view of a portion of the vessel of FIGS. 1 and 2, showing the novel, first embodiment of improved sealing means in greater detail;

FIG. 4 is an exploded view of the sealing means of FIG. 3, the same depicting the structure of the sealing means prior to the closure of the interfacing elements of the fluid joint of the pressure vessel onto the sealing means;

Figure 5:
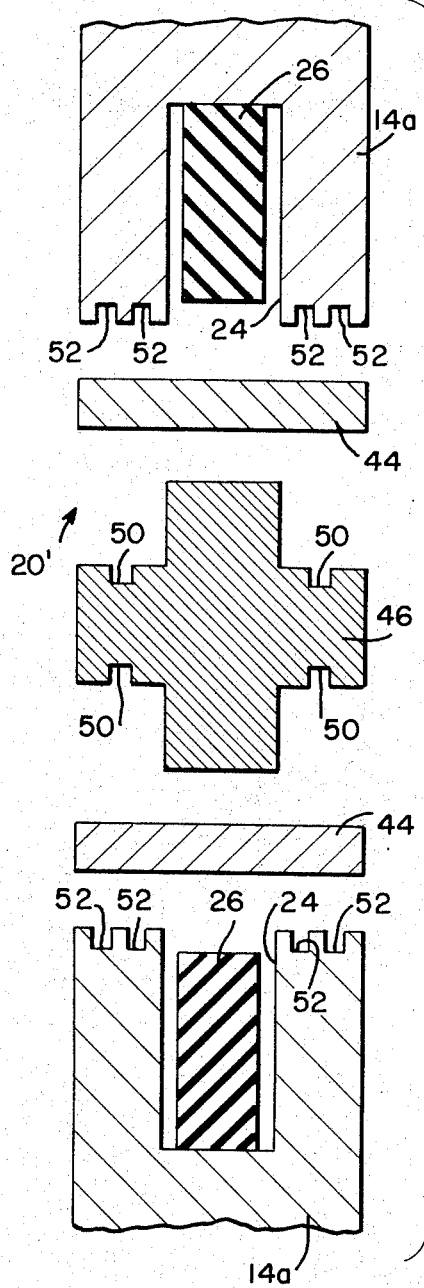
Figure 6:
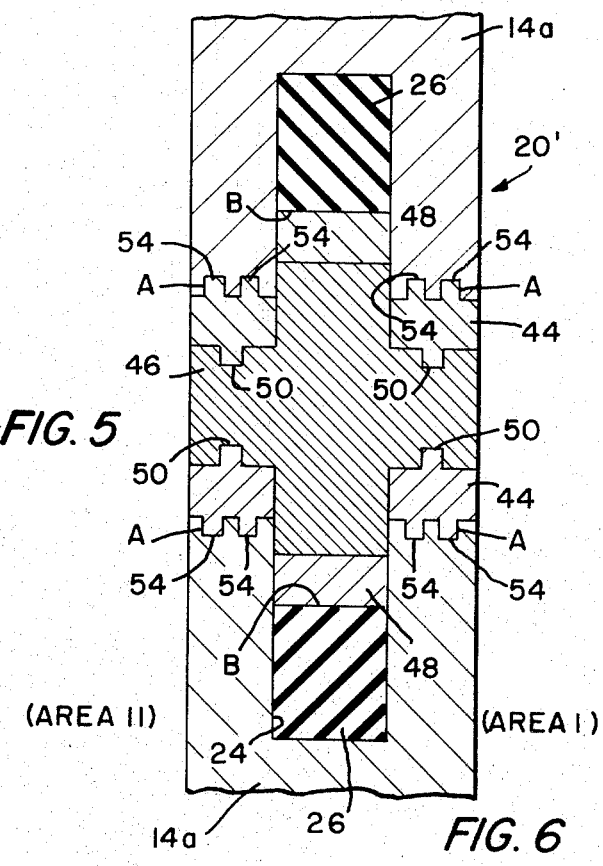
Figure 7:
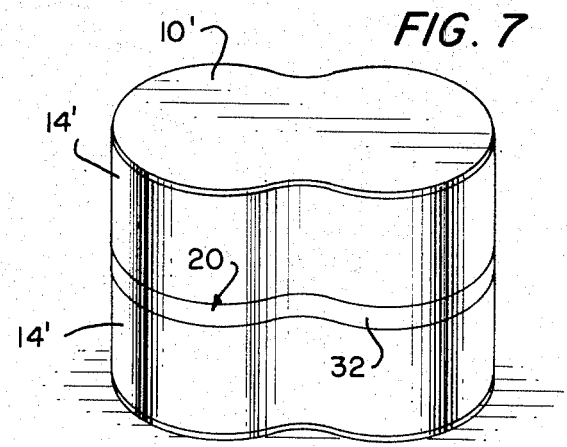

FIGS. 5 and 6, respectively, are an exploded view and an operatively closed view of an alternate embodiment of the invention; and FIG. 7 is a perspective view of a pressure vessel of non-uniform cross-section in which, by way of example, the novel sealing means has a particular facility and utility.

As shown in FIGS. 1 and 2, a pressure vessel 10 (only a portion thereof being being shown) is comprised of an end closure 12, a plurality of co-active cylindrical wall members 14, and enveloping through-bolts 16 which, with lock nuts 18, constrain the wall members 14 against the inventive sealing means 20. The end closure 12 had a port 22 formed therein for the address thereat of a vacuum or fluid pressure.

The sealing means 20 is shown in greater detail in FIGS. 3 and 4. Here it can be seen that the wall members 14 have recesses 24 formed therein to receive resilient sealing elements 26 therewithin. Optionally, only to facilitate assembly, a terminal and readily degradable cement may be used at 28 to cause elements 26 to hold positioning until the wall members 14 have been closed upon the sealing means 20. To allow for a compression-induced expansion or "thickening growth" of the elements 26, lateral spaces 30 are provided between the walls of the recesses 24 and the sides of the elements 26.

A cross-sectionally, cruciform-shaped, ductile element 32 is interpositioned between the interfacing surfaces 34 of wall members 14. Oppositely disposed limbs 36 of the element 32 have a cross-sectional dimension X which is complementary to the width Y of recesses 24. However, the limbs 36 have terminal shoulders 38 formed thereon which, with pressured closure of the wall members toward each other, are sheared off. To accommodate for the compressed nesting of the sheared-off shoulders 38, the ductile element has recesses 40, and tapered surfaces 41, formed in the other pair of limbs 42.

In use, the sealing elements 26 are disposed in recesses 24. Then, the ductile element 32 is interpositioned between surfaces 34. By torquing the lock nuts 18, the wall members 14 are forced towards each other — resulting in a shearing off of the shoulders 38, the nesting of the shoulders into the recesses 40, a compression of sealing elements 26, and a deformable compression of limbs 42.

Simply, the wall members 14 are compressed into/against the limbs 42 with that pressure which equals or exceeds the pressure of the fluid to be contained by the vessel 10 — or, a compression complementary to a vacuum to be contained by the vessel.

The ductile element 32, which may be formed of lead, copper, soft steel, or the like, yields under pressure and meets the optimum configuration along the length thereof, and the narrowed cross-sectional dimension, which will contain the fluid pressure or vacuum. The limbs 42 are squeezed between surfaces 34, and shoulders 38 are sheared off and deposited, compressively, within recesses 40.

In the alternate embodiment 20' of the novel sealing means, wall members 14a, as shown in FIGS. 5 and 6, close upon a plurality of ductile elements 44 — again that resilient elements 26 might be compressed into recesses 24. In this embodiment, however, a cutting die 46 is employed. Die 46 punches out a conforming sealing sub-element 48 which, like the embodiment of FIGS. 3 and 4, compresses the resilient elements 26. Further, however, the die 46 has recesses 50 formed in opposed limbs thereof which receive portions of the residual components of the ductile elements 44 therewithin.

To effect an enhanced sealing, the wall members 14a have a plurality of recesses 52 formed therein which cooperate with the recesses 50 to disrupt the elements 44, to either sides thereof, to cause a nesting of portions 54 within same.

As represented in FIGS. 3 and 6, the embodiments of the novel sealing means present a plurality of four compliant sealing surfaces A and a pair of resilient sealing surfaces B to the oppositely disposed fluid pressure areas: "Area I" and "Area II."

The novel sealing means, as disclosed, are usable on cylindrical vessels, linear walls, and joined closure members of non-linear configuration. Novelly, the disclosure teaches means for forming the ductile element — as sealing element 44, for instance — into a conformity with the sealing configuration as required.

FIG. 7 presents a perspective view of a pressure vessel 10' in which wall members 14', for instance, compress a sealing means 20 therebetween. In such an application of the sealing means 20, of course, the ductile element 32 needs only to be roughly conformed, by hand, to the undulated periphery of the wall members 14'. Upon closure of the wall members 14' toward each other, a conforming, die-cutting of element 32 is realized.

In the prior art, it has been necessary to machine the mating surfaces of closure members, such as members 14 or 14a, to a required configuration. Thereafter, according to the prior practices, it has been necessary to define a closure element, such as element 46, of the corresponding configuration. Finally, it has been the required practice to machine a further sealing element, similar to element 44, into the prescribed configuration. According to the instant teaching, it is quite unnecessary to machine an element such as element 44 to any precise configuration. Rather, it is only necessary to interpose a ductile element of sufficient width between interfacing surfaces of members 14a, and/or an element 46, to die-cut and form a requisite sealing element therefrom.

At great expense, then, and with the expediture of valuable machinist's time and expertise, the prior art has required that sealing means for a fluid joint of some indeterminate configuration have all elements of the sealing means be pre-formed in the requisite configuration for a closure of the joint. The instant teaching obviates the requirement for the ductile element to be pre-machined and/or preformed. Rather, it is the present teaching herein for the ductile element to be cut-to-fit, in the process of assembling and closing the sealing means, to meet the sealing requirement. Additionally, if not finally, the novel sealing means disclosed herein comprise the interposition of not less than four compliant sealing surfaces, and at least two resilient surfaces, between first and second sealing areas of a pressure vessel or the like.

While the invention has been described in connection with specific embodiments thereof, however, it is to be clearly understood that this is done only by way of example, and not as a limitation to the scope of the invention as set forth in the objects thereof and in the appended claims.

I claim:

1. Sealing means for a fluid joint, wherein the joint is formed by interfacing members of indeterminate configuration along the joint, and said members have recesses formed in the interfacing surfaces thereof, comprising:

a plurality of resilient elements disposed in said recesses; and a ductile element compressed between said interfacing surfaces;

said ductile element having surfaces which compressively constrain said resilient elements in said recesses; and wherein said interfacing members and said ductile element cooperate to define first and second fluid pressure areas to either sides of said fluid joint; and said interfacing surfaces, said ductile element, and said resilient elements cooperatively define at least four compliant sealing surfaces and at least two resilient sealing surfaces between said first and second fluid pressure areas.

2. Sealing means, according to claim 1, wherein:

said ductile element is of cruciform cross-section;

oppositely disposed limbs of said cruciform-shape ductile element have cross-sectional dimensions which are complementary to the width of said recesses, and have oppositely extending shoulders formed at terminal ends thereof which exceed said width; and said cruciform-shape ductile element further has recesses formed in limbs thereof, other than said oppositely disposed limbs, for compressively receiving said shoulders therewithin.

3. Sealing means, according to claim 1, wherein:

said ductile element is of cruciform shape in cross-section;

said cruciform-shape ductile element has recesses formed in oppositely disposed limbs thereof; and said interfacing surfaces of said members have surface portions which constrain sheared-off sub-elements of said ductile element within said recesses of said ductile element.

4. Sealing means, according to claim 1, wherein:

a plurality of ductile elements are compressed between said interfacing surfaces; and further including a die interpositioned between said plurality of ductile elements.

5. Sealing means, according to claim 4, wherein:

said plurality of ductile elements comprises at least six ductile elements.
6. Sealing means, according to claim 5, wherein:
at least four of said ductile elements have portions thereof confined within both said recesses of said interfacing members and within said die; and
at least two of said ductile elements are wholly confined within said recesses of said interfacing members only.
7. Sealing means, according to claim 6, wherein: said four ductile elements each have a plurality of portions thereof confined within said recesses of said interfacing members.
8. Sealing means, according to claim 7, wherein:
said die is of predetermined formation, conforming to said indeterminate configuration; and
said plurality of ductile elements are conformed to said indeterminate configuration only upon compression thereof between said interfacing surfaces.

\* \* \* \* \*